Patented Mar. 27, 1951

2,546,274

UNITED STATES PATENT OFFICE 2,546,274

DERIVATIVES OF DISUBSTITUTED METHANE COMPOUNDS AND METHOD OF MAKING THEM

Gordon James Pritchard, Halewood, Liverpool, England, assignor to Ward Blenkinsop & Company Limited, London, England, a company of Great Britain No Drawing. Application June 23, 1947, Serial No. 756,564. In Great Britain October 30, 1945

Section 1, Public Law 690, August 8, 1946
Patent expires October 30, 1965

11 Claims. (Cl. 260—433)

British Patents Nos. 547,564 and 552,751 describe the preparation of substances useful for the treatment of burns and other lesions, and other like purposes, by causing metals or organic compounds having bactericidal, fungicidal, or other useful properties to combine with certain disubstituted methane compounds, there referred to as "D. S. M. compounds."

These D. S. M. compounds are prepared by condensation of aromatic mono-, di-, or polysulphonic acids, which may also carry hydroxy, halogen or other substituents so long as replaceable hydrogen atoms remain in the aromatic ring, with formaldehyde, with production of combinations of the general formula,

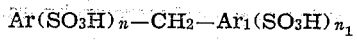

where Ar, Ar₁ are residues of aromatic ring structures with or without other substituents and carrying also the sulphonic acid groups, and $n$, $n_1$ are 1, 2, 3 or more. Generally, but not necessarily Ar $(SO_3H)_n$ and Ar₁ $(SO_3H)_{n_1}$ are identical.

U. S. application Ser. No. 756,563, filed June 23, 1947, by Sheila Edith Bywater and myself describes the preparation of compounds by reacting aryl organometallic compounds having bactericidal, fungicidal and other useful properties with D. S. M. compounds. In said application organo-metallic compounds are described as being compounds of the general formula $R_3MA$ where $R_3$ is an alkyl, aryl, aralkyl or heterocyclic radical which may or may not be substituted with neutral, acidic or basic substituents, M is a polyvalent metal, and A is an acid radical.

I have now found, as a further development of the researches which led to the processes described in the above mentioned application, that new and valuable compounds, of a kindred nature, can be prepared by the use in place of formaldehyde of other compounds of aldehydic function, or of ketones, which are condensed with aromatic sulphonic acids of the kinds described, and the resulting compounds combined with organic-metallic compounds of the kind described.

According to the invention therefore I prepare new substituted methane compounds by condensing aromatic mono-, di- or polysulphonic acids, which may also carry hydroxy, halogen-amino or other substituents so long as one or more replaceable hydrogen atoms remain in the aromatic ring with compounds of aldehydic function other than formaldehyde, or with ketones, and converting the resulting tri- or tetra-substituted methane compounds into salt-like bodies by combining them with alkyl, aryl, aralkyl or heterocyclic organometallic compounds.

According to an alternative method of carrying out the invention I may first combine the aryl sulphonic acid with the organo-metallic compound and condense the resulting salt-like compound with the aldehyde or ketone.

The formation of the sulphonic acid condensation products which by combining with the organo-metallic compounds, form the new salts may be represented by the following equation:

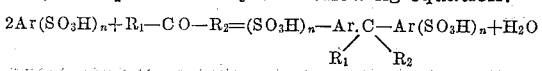

where Ar is the residue of an aromatic ring structure with or without substituents and carrying one or more sulphonic acid groups, $n$ is 1, 2 or more and $R_1R_2$ are the radicals drawn from the carbonyl compound, and may be aliphatic together from $C_1$ to $C_{20}$, aryl or aralkyl, cycloaliphatic or heterocyclic, or together they may form a cycloaliphatic system. Where the carbonyl compound is an aldehyde, $R_1$ will be hydrogen.

The use of mixtures of aryl sulphonic acids will of course lead to mixed tri- and tetra-substituted methane compounds along with the two symmetrical tri- and tetra-substituted methane compounds.

As compounds of aldehydic function I may use aliphatic aromatic or cycloaliphatic aldehydes, both carbocyclic and heterocyclic, as well as compounds yielding such derivatives, such as polymers or acetals or the like, or compounds having latent aldehydic properties, such as the aldose sugars. I may also use ketones, which will of course lead to tetra-substituted methane compounds.

Tri- or tetra-substituted methane compounds of the kinds produced according to the present invention are herein referred to as "T. S. M. compounds."

Although the invention is not limited in this respect I prefer to use organometallic compounds of mercury. Among these may be mentioned alkyl, aralkyl, aryl and heterocyclic mercury compounds, such for example as benzene-naphthalene-pyridine, quinoline mercuric hydroxides, or other salts which react with metallic salts of the T. S. M. compounds; thus for example I may use sulphates to react with barium compounds or halides with silver compounds. Nitro groups or halogen atoms may also be present in the aromatic rings.

According to yet a third method of carrying out the present process I may introduce the three reaction components into one and the same solvent, and cause the desired condensation reaction to take place in such solutions. This method is particularly advantageous in the case of the employment of the new compounds for preservation of timber or the like in which case I may treat the timber by an impregnation of imbibition process with such a solution and cause the new compound to be formed within the timber or other material being treated, either with or without the assistance of heat and/or pressure.

The condensation is, in general carried out in solution and water is the usual solvent. With some more complex long-chain aliphatic or aromatic aldehydes, a non-aqueous solvent such as ethyl alcohol may with advantage be used as it is preferred that all the reacting components should be in solution at the outset. The parent sulphonic acid or acids may be added either before or after the organometallic constituent, and the aldehydic, ketonic or other carbonyl compound may be added either with, before or after either of the other two components. The condensation is generally, but not necessarily carried out by heating and either with or without agitation. If desired a suitable condensing agent such for example as sulphuric acid or phosphorus oxychloride may be added.

In the case of non-aqueous solvents, the water may be removed by entrainment in the familiar way.

Whilst of course the invention comprises the production of the new substances in solid form, it is not limited to the carrying out of the reaction with stoichiometric proportions of the reaction components, and important advantages can, according to the invention, be secured by departing from such proportions.

It has hitherto been a drawback to the general use of organometallic compounds, particularly the aryl mercury compound that their solubilities in water and aqueous solutions, and in the commoner organic solvents are far too low for satisfactory application of the compounds.

I have found that the new salt-like compounds are readily soluble, in an excess of the corresponding or of one or more different T. S. M. compounds (or of their components), as well as in an excess of the parent sulphonic acids, or in D. S. m. compounds, and this property enables the new compounds to be prepared in the form of solutions, suitable for application either as such or after dilution with water if necessary.

In general I have found that a pH value of from 4–6.5 is usually advantageous, and this can conveniently be attained by a suitable adjustment of the quantities of the above-mentioned solubilising substances; it should however be noted that the use of other substances, such for example as mineral acids for the purpose of pH adjustments would not fall outside the scope of the invention.

The desired effect can be achieved either by first preparing the solid compounds and then dissolving it in a suitable quantity of the selected solubilising agent or agents, so as to produce a solution of the desired strength and pH value or the composition of the reaction mixture can be so adjusted as to yield a solution of the new compound after completion of the reaction, any necessary adjustment of pH value being subsequently carried out.

The new compounds prepared according to the present invention will be found to be useful for many purposes, and by suitably selecting the components, compounds can be prepared which will be found to have valuable bactericidal, fungicidal or other properties, and which find various uses such as for the treatment of burns, wounds or other lesions, or as rot-proofing or mould preventing agents, or for the preservation of protein, or cellulosic material or timber.

In order to facilitate a better understanding of the invention the following examples of how it may be carried out, are given only by way of illustrations:

*Example 1*

6.7 parts by weight of phenyl mercury acetate were dissolved in 120 parts by weight of ethyl alcohol (74 o. p.) and 15 parts by weight of a 37% solution of the T. S. M. compound prepared by condensing piperonal with naphthalene-2-sulphonic acid added; the whole was heated to boiling and on cooling 2.7 parts by weight of the phenyl mercury complex separated as a greyish powder.

Found: Hg 49.5%
$C_{40}H_{28}O_8S_2Hg_2$ (the true salt) requires Hg=36.43%
$C_{52}H_{40}O_{10}S_2Hg_4$ (the basic salt) requires Hg=47.5%

*Example 2*

In a similar manner a phenyl mercury complex was made by reacting phenyl mercury hydroxide with the T. S. M. compound prepared by condensing acetaldehyde with naphthalene-2-sulphonic acid. 78.3 parts by weight of 0.38% alcoholic solution of phenyl mercury hydroxide was treated with 1.1 parts by weight of a 40.4% solution of bis(naphthalene-2-sulphonic acid)-methyl methane. On evaporating off the excess alcohol the phenyl mercury compound separated as a greyish brown powder.

Found: Hg 51.1%
$C_{34}H_{26}O_6S_2HG_2$ (the true salt) requires Hg: 40.3%
$C_{46}H_{38}O_8S_2Hg_4$ (the basic salt) requires Hg: 50.7%

*Example 3*

In place of the T. S. M. compound prepared by condensing piperonal with naphthalene-2-sulphonic acid in Example 1, the T. S. M. compound prepared by reacting vanillin with naphthalene-2-sulphonic acid was used, 17.6 parts by weight of a 31% solution of this T. S. M. compound was added to 6.72 parts by weight of phenyl mercury acetate dissolved in 120 parts by weight of ethyl alcohol (74. o. p.); the solution was charcoaled and filtered, and on cooling the phenyl mercury complex separated as a purplish powder.

Found: Hg 45.3%
$C_{40}H_{30}O_8S_2Hg_2$ (the true salt) requires Hg: 36.4%
$C_{52}H_{42}O_{10}S_2Hg_4$ (the basic salt) requires Hg: 47.4%

*Example 4*

In a similar fashion the T. S. M. compound prepared by condensing anisaldehyde naphthalene-2-sulphonic acid was allowed to react with phenyl mercury acetate; 16.45 parts by weight of a 28.1% aqueous solution of this T. S. M. compound was added to 5.8 parts by weight of phenyl mercury acetate dissolved in 128 parts by weight of ethyl alcohol (74 o. p.) the phenyl mercury complex separated on concentrating the alcoholic solution as a pinkish buff powder.

Found: Hg 47.4%
$C_{40}H_{30}O_7S_2Hg_2$ (the true salt) requires Hg 37.1%
$C_{50}H_{42}O_9S_2Hg_4$ (the basic salt) requires Hg 47.7%

Example 5

6.7 parts by weight of phenyl mercury acetate were dissolved in 150 parts by weight of hot ethyl alcohol (74 o. p.) and 27.3 parts by weight of an 11.5% solution of the T. S. M. compound prepared by condensing acetaldehyde with naphthalene-2:7-disulphonic acid added; on evaporating the alcoholic solution to small bulk and cooling 4 parts by weight of the phenyl mercury complex separated.

Found: Hg 45.7%

The phenyl mercury complex dissolves to the extent of 1% in 10% bis-(naphthalene-2:7 sulphonic acid) methyl methane and this solution is stable on dilution and adjustment to any pH.

$C_{46}H_{34}O_{12}S_4Hg_4$ (the true salt) requires Hg 47.0%
$C_{70}H_{58}O_{16}S_4Hg_8$ (the basic salt) requires Hg 55.6%

Alternatively 6.72 parts by weight of phenyl mercury acetate were treated as described above, but only half the quantity of T. S. M. acid i. e. 13.65 parts by weight of an 11.5% solution added, on evaporating the alcohol solution to small bulk and cooling 5 parts by weight of the phenyl mercury complex separated.

Found: Hg 54.6%

The phenyl mercury basic complex dissolves to the extent of 0.5% in 5% bis-(naphthalene-2-sulphonic acid) methane or 5% bis-(naphthalene-2:7-sulphonic acid) methane.

$C_{46}H_{34}O_{12}S_4Hg_4$: the true salt requires Hg 47.0%
$C_{70}H_{58}O_{16}S_4Hg_8$: the basic salt requires Hg 55.6%

Example 6

In place of the T. S. M. compound prepared by condensing piperonal with naphthalene-2-sulphonic acid in Example 1, the T. S. M. compound prepared by reacting acetone with naphthalene-2-sulphonic acid was used, a 29% aqueous solution was added to 6.7 parts by weight of phenyl mercury acetate dissolved in 120 parts by weight of ethyl alcohol (74 o. p.) until the whole reacted just acid to Congo paper. The precipitate which separated was filtered off and analysed as follows:

Found: Hg—52.1%
$C_{26}H_{28}O_6S_2Hg_2$ (the true salt) requires Hg— 39.8%
$C_{47}H_{40}O_8S_2Hg_4$ (the basic salt) requires Hg— 50.2%

Example 7

11.0 parts by weight of a 45% aqueous solution of the T. S. M. compound prepared by condensing benzaldehyde with naphthalene-2-sulphonic acid was added to 6.72 parts by weight of phenyl mercury acetate dissolved in 120 parts by weight of ethyl alcohol (74 o. p.) on evaporating the phenyl mercury complex was obtained as a buff powder.

Found: Hg—49.9%
$C_{39}H_{28}O_6S_2Hg_2$ (the true salt) requires Hg= 37.9%
$C_{51}H_{40}O_8S_2Hg_4$ (the basic salt) requires Hg= 48.8%

Example 8

20.8 parts by weight of naphthalene-2-sulphonic acid (10 equivalents) are fused at 100° C. and 3.36 parts by weight of phenyl mercury acetate (1 equivalent) are slowly fed into the melt with stirring; this dissolves and acetic acid vapor is given off; 2.4 parts by weight of acetaldehyde (11 equivalents) are then added in three portions over one hour and the reaction mixture heated for 6 hours at 100° until the smell of the acetaldehyde has disappeared; the resulting solution of the phenyl mercury complex in the T. S. M. compound derived from naphthalene-2-sulphonic acid may be diluted with 100 parts by weight of water and neutralised to the desired pH by the addition of sodium hydroxide.

Example 9

5.89 parts by water of phenyl mercury hydroxide were dissolved in water to give 1% solution, and 4.16 parts by weight of naphthalene-2-sulphonic acid were added, this was followed by 4.4 parts by weight of acetaldehyde. The whole was then diluted with water to give a total volume equivalent to 20,000 parts by water; the timber for preservation was immersed in this solution for a minimum of 24 hours.

Example 10

13.4 parts by weight of phenyl mercury acetate (2 moles) were dissolved in 400 parts by water of hot ethyl alcohol (74 o. p.) the solution treated with a little charcoal and filtered, and to the hot alcoholic solution was then added 72.8 parts by water of the T. S. M. compound formed by the condensation of 2-naphthol-6-sulphonic acid with octyl aldehyde, in 15.15% concentration (1 mole) with stirring. After cooling and allowing to stand over-night, 6.2 parts by weight of a brownish-yellow powder were filtered off.

Found: Hg=35.5%
$C_{40}H_{38}O_8S_2Hg_2$ requires Hg=36.1%
0.66% soluble in 10% solution of bis-(naphthalene-2-sulphonic acid) methane.
0.5% soluble in 10% of bis-(naphthol-6-sulphonic acid) heptyl methane.
0.4% soluble in 10% solution of naphthalene-2-sulphonic acid.

Example 11

3.36 parts by weight of phenyl mercury acetate was dissolved in 80 parts by weight of ethyl alcohol (74 o. p.) and 7.37 parts by weight of bis-(2-naphthol-6-sulphonic acid) diaminomethane added to the hot alcoholic solution; the solution was boiled for a short time with charcoal, filtered, and concentrated to half its volume and allowed to crystallise; yielding 2 parts by weight of phenyl mercury complex.

Found: Hg=44.5%

This appears to be a compound of the normal with the basic salt.

$C_{33}H_{26}O_8N_2S_2Hg_2$, $C_{45}H_{38}O_{10}N_2S_2Hg_4$ requires Hg= 44.9%
The normal salt, $C_{33}H_{26}O_8N_2S_2Hg_2$ requires Hg=38.5%
The basic salt, $C_{45}H_{38}O_{10}N_2S_2Hg_4$ requires Hg= 49.1%

This compound shows the following approximate solubilities:

0.66% soluble in a 10% of bis-(naphthalene-2-sulphonic acid) methane.
0.33% soluble in a 10% solution of bis-(2-naphthol-6-sulphonic acid) diaminomethane.
0.5% soluble in a 10% solution of naphthalene-2-sulphonic acid.

Example 12

3.66 parts by weight of phenyl mercury acetate was dissolved in 120 parts by weight of hot ethyl alcohol (74 o. p.) 18.2 parts by weight of a 15.1% solution of bis-(2-naphthol-6-sulphonic acid) heptyl-methane was added, and on standing over-night, the phenyl mercury complex separated as a yellowish-brown powder, 1.6 parts by weight.

Found: Hg=35.5%
$C_{40}H_{38}O_8S_2Hg_2$ (the normal salt) requires Hg=36.1%

Example 13

3.36 parts by weight of phenyl mercury acetate was dissolved in 80 parts by weight of hot ethyl alcohol (74 o. p.) 16.0 parts by weight of a 19.2% solution of bis-(2-naphthol-6-sulphonic acid)-diphenylmethane was added. On evaporation a brownish-pink powder separated, 3 parts by weight. This complex appeared to be a combination of normal basic salts.

Found: Hg=40.5%
$C_{45}H_{32}O_8S_2Hg_2$, $C_{57}H_{44}O_{10}S_2Hg_4$ requires Hg=41.2%
The normal salt, $C_{45}H_{32}O_8S_2Hg_2$ requires Hg=34.4%
The basic salt, $C_{57}H_{44}O_{10}S_2Hg_4$ requires Hg=45.7%

Example 14

4.34 parts by weight of 4-aminophenylarsenic acid was dissolved in 11.25 parts by weight of a 39.3% aqueous solution of bis-(naphthalene-2-sulphonic acid) ethane, and the solution was evaporated to dryness, yielding 8.5 parts by weight of the arsenic complex, in the form of a brown powder.

Found: As=16.9%
$C_{34}H_{34}O_{12}N_2S_2As_2$ requires As=17.1%

This complex dissolved in water to give a 1% solution of a clear amber colour. Before use the pH of the solution was adjusted to 4–4.5.

Example 15

10 parts by weight of pyridyl mercury acetate (2 moles) was dissolved in 500 parts by weight of hot ethyl alcohol (74 o. p.) the solution was then treated with a little charcoal and filtered. To the hot alcoholic solution was then added 16.5 parts by weight of the T. S. M. condensation product of naphthalene-2-sulphonic acid and acetaldehyde in 39.3% concentration.

The creamy white powder was filtered off, washed with ether, dried at 100° C.

Found: Hg=40.5%
$C_{32}H_{24}O_6N_2S_2Hg_2$ requires Hg=40.4%

This white powder dissolves to the extent of 1% in a 10% aqueous solution of bis-(naphthalene-2-sulphonic acid) methane.

Example 16

5.89 parts by weight of "H" acid (1-amino-8-hydroxynaphthalene-3:6-sulphonic acid) were suspended in 10 parts water, 1.5 parts by weight of 50% aqueous acetaldehyde added and the mixture allowed to stand for 16 hours and then heated on steam bath for 1 hour.

1.66 parts by weight of bis-(1-amino-8-hydroxynaphthalene-3:6-disulphonic acid) methylmethane were dissolved in 50 parts by weight of 33% alcohol and added to a hot solution of 1.68 parts by weight of phenyl mercury acetate in 40 parts by weight of alcohol (74 o. p.) solution boiled, filtered and evaporated. A greenish yellow powder separates out which on analysis contains—

Found: Hg=52.1%
$C_{46}H_{36}O_{14}N_2S_4Hg_4$ (neutral) requires Hg=45.3%
$C_{70}H_{60}O_{18}N_2S_4Hg_8$ (basic) requires Hg=54.4%

Example 17

To a solution of 3.36 parts by weight of phenyl mercury acetate in 65 parts by weight of ethyl alcohol (74 o. p.) was added 12 parts by weight of the condensation product of naphthalene-2-sulphonic acid and dextrose. The solution was heated to boiling, charcoaled and filtered, and allowed to crystallise. A white powder was filtered off and dried yielding 1.3 grams containing 56.1% Hg. A second crop was obtained; 1.5 grams, by evaporation to dryness.

Found: Hg=54.1%
$C_{50}H_{46}O_{13}S_2Hg_4$ (basic salt) requires Hg 46.6%

Example 18

1 part by weight of the phenyl-mercury complex of bis-(naphthalene-2-sulphonic acid) methyl methane was dissolved in 78 parts by weight of a 33% solution of bis-(naphthalene-2-sulphonic acid) methyl methane by warming gently. The solution was neutralised to pH=7 by addition of ammonia in 25% aqueous solution, and the whole then diluted by addition of 10,000 parts by weight of water. The solution was then ready for use.

Example 19

1 part by weight of the phenyl mercury complex of bis-(naphthalene-2-sulphonic acid) methyl methane was dissolved in 2.6 parts by weight of bis-(naphthalene-2-sulphonic acid) methyl methane. 4 parts by weight of sodium fluoride was then added to the solution, and the whole diluted to 10,000 parts and the pH of the solution adjusted to 4–4.5. Sodium dichromate and dinitrophenol may with advantage be incorporated in this solution.

Example 20

The phenyl mercury complex obtained by the reaction of phenyl mercury acetate with bis-(naphthalene-2-sulphonic acid) methyl methane was dissolved to give a 0.1% solution of bis-(naphthalene-2-sulphonic acid) methyl methane; to 100 parts of this solution 4 parts by weight of potassium bichromate was added followed by 4 parts by weight of sodium fluoride. The solution was then ready for use in wood impregnation.

Example 21

To 16.5 parts by weight of the T. S. M. condensation product of naphthalene-2-sulphonic acid and acetaldehyde in 39.3% was added the equivalent amount of ethyl mercury hydroxide. On evaporation the complex of bis-(naphthalene-2-sulphonic acid) methyl methane and ethyl mercury hydroxide was obtained.

Found: Hg=45.1%
$C_{26}H_{26}O_6S_2Hg_2$ (the normal salt) requires Hg=44.6%

I claim:
1. A method of manufacturing new derivatives of methane in which a sulphonic acid selected from the group consisting of aromatic mono-, di-, and polysulphonic acids, and hydroxy, halogen and amino substituted aromatic mono-, di-, and polysulphonic acids, all of said acids having at least one replaceable hydrogen atom in the aromatic ring, a carbonyl compound selected from the group consisting of compounds of aldehydic function having at least two carbon atoms and ketones, and a compound of the formula $R_3.Hg.A$, where $R_3$ is a radical selected from the group consisting of alkyl, aryl, aralkyl, and heterocyclic radicals and A is an acid radical are reacted.

2. Process as defined in claim 1 in which the sulphonic acid is condensed with the carbonyl compound and the resulting substituted methane compound is reacted with the compound $R_3.Hg.A$.

3. Process as defined in claim 1 in which the sulphonic acid is first reacted with the compound $R_3Hg.A$ and the resulting compound is condensed with the carbonyl compound.

4. The process defined in claim 1 in which the sulphonic acid is a naphthalene sulphonic acid.

5. The process defined in claim 1 in which the condensation is carried out in a solvent.

6. The process defined in claim 1 in which the condensation is carried out with the aid of a dehydrating agent.

7. A method of manufacturing new derivatives of methane in which a sulphonic acid selected from the group consisting of aromatic mono-, di-, and polysulphonic acids and hydroxy, halogen and aminosubstituted aromatic mono-, di-, and polysulphonic acids, all of said acids having at least one replaceable hydrogen atom in the aromatic ring, is condensed with a carbonyl compound selected from the group consisting of compounds of aldehydic function having at least two carbon atoms and ketones and the resulting substituted methane compound is reacted with a member of the group consisting of phenyl mercury salts and phenyl mercury hydroxide.

8. As a new compound the bis-phenylmercury salt of a compound of the formula $R_1.R_2.R_1$, where $R_1$ is a naphthalene-2-sulphonic acid residue and $R_2$ is the piperonyl residue

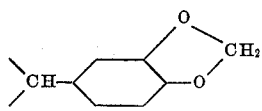

and the mercury atoms of the phenyl mercury radicals are connected directly to the $SO_3$ groups of the sulphonic acid residues.

9. As a new compound the bis-phenyl mercury salt of a compound of the formula $R_1.R_2.R_1$ where $R_1$ is a naphthalene-2-sulphonic acid residue and $R_2$ is the n-octyl aldehyde residue ($C_7H_{15}CH<$) and the mercury atoms of the phenyl mercury radicals are connected directly to the $SO_3$ groups of the sulphonic acid residues.

10. As new compounds compounds of the general formula

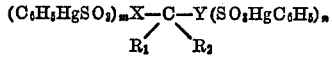

where X and Y are each selected from the group consisting of aromatic ring structures and hydroxy, halogen and amino substituted aromatic ring structures, $n$ and $m$ are small integers and the group

is a residue of a carbonyl compound of the general formula $R_1CO.R_2$ which carbonyl compound is selected from the group consisting of compounds of aldehydic function having at least two carbon atoms and ketones, $R_1$ and $R_2$ are members of the group consisting of aliphatic radicals together from $C_1$ to $C_{20}$, aryl, aralkyl, cycloaliphatic and heterocyclic radicals and hydrogen, not more than one of them being hydrogen and X and Y are connected directly to the $SO_3$ groups.

11. As new compounds compounds of the general formula

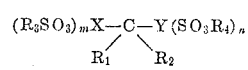

where X and Y are each selected from the group consisting of aromatic ring structures and hydroxy, halogen and amino substituted aromatic ring structures, $m$ and $n$ are small integers, the group

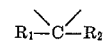

is a residue of a carbonyl compound $R_1CO.R_2$ which carbonyl compound is selected from the group consisting of compounds of aldehydic function having at least two carbon atoms and ketones, $R_3$ and $R_4$ are residues each selected from the group consisting of residues of alkyl, aryl, aralkyl and heterocyclic organometallic compounds, $R_1$ and $R_2$ are members of the group consisting of aliphatic radicals together from $C_1$ to $C_{20}$, aryl, aralkyl, cycloaliphatic and heterocyclic radicals and hydrogen, not more than one of them being hydrogen and X and Y are connected directly to the $SO_3$ groups.

GORDON JAMES PRITCHARD.

REFERENCES CITED

The following references are of record in the file of this patent:

UNITED STATES PATENTS

| Number | Name | Date |
| --- | --- | --- |
| 1,986,044 | Casaburi | Jan. 1, 1935 |
| 2,021,137 | Stone | Nov. 19, 1935 |
| 2,131,008 | Hibben | Sept. 20, 1938 |
| 2,140,878 | Lurie | Dec. 20, 1938 |
| 2,215,457 | Andersen | Sept. 24, 1940 |
| 2,335,136 | Thuau | Nov. 24, 1943 |
| 2,344,019 | Bostrum | Mar. 14, 1944 |

FOREIGN PATENTS

| Number | Country | Date |
| --- | --- | --- |
| 547,564 | Great Britain | Sept. 2, 1942 |
| 552,751 | Great Britain | Apr. 22, 1943 |